United States Patent
Minobe

(10) Patent No.: US 9,035,963 B2
(45) Date of Patent: May 19, 2015

(54) DISPLAY CONTROL APPARATUS AND DISPLAY CONTROL METHOD

(75) Inventor: Miyako Minobe, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 795 days.

(21) Appl. No.: 12/478,043

(22) Filed: Jun. 4, 2009

(65) Prior Publication Data

US 2009/0304300 A1 Dec. 10, 2009

(30) Foreign Application Priority Data

Jun. 10, 2008 (JP) .................................. 2008-152256

(51) Int. Cl.
*G06T 5/00* (2006.01)
*H04N 5/21* (2006.01)
*H04N 9/64* (2006.01)

(52) U.S. Cl.
CPC ........ *H04N 5/21* (2013.01); *G06T 2207/20008* (2013.01); *G06T 2207/10004* (2013.01); *G06T 5/00* (2013.01); *H04N 9/64* (2013.01)

(58) Field of Classification Search
CPC .......................... G09G 2340/125; G06T 11/60
USPC ....................................................... 345/638
See application file for complete search history.

(56) References Cited

U.S. PATENT DOCUMENTS

| 5,828,383 A * | 10/1998 | May et al. ...................... 345/546 |
| 6,870,547 B1 * | 3/2005 | Crosby et al. .................. 345/619 |
| 2004/0036898 A1 * | 2/2004 | Takahashi ...................... 358/1.9 |
| 2004/0141069 A1 * | 7/2004 | Nakami ..................... 348/231.6 |
| 2005/0168483 A1 | 8/2005 | Hirata |
| 2007/0201858 A1 * | 8/2007 | Shiohara ........................ 396/310 |
| 2008/0168493 A1 * | 7/2008 | Allen et al. ..................... 725/37 |
| 2009/0073183 A1 * | 3/2009 | Jang .............................. 345/594 |

FOREIGN PATENT DOCUMENTS

| JP | 09-139865 | 5/1997 |
| JP | 10-079899 | 3/1998 |
| JP | 2005-077859 | 3/2005 |

* cited by examiner

*Primary Examiner* — Aaron M Richer
(74) *Attorney, Agent, or Firm* — Cowan, Liebowitz & Latman, P.C.

(57) ABSTRACT

A display control apparatus including a first image data input unit to which first image data is input, a second image data input unit to which second image data is input, a user operation reception unit that receives a user operation, an image quality correction unit that performs image quality correction processing of input first image data in response to the user operation and generates and outputs image data for display of the first image data or of corrected first image data, an image quality adjustment unit that performs image quality adjustment processing of the image data output from the image quality correction unit and the second image data using preset parameters, and a control unit that controls the image quality adjustment unit to disable/enable the image quality adjustment processing with the image quality correction unit in on/off state, respectively.

20 Claims, 3 Drawing Sheets

DISPLAY CONTROL APPARATUS AND DISPLAY CONTROL METHOD

BACKGROUND OF THE INVENTION

1. Field of the Invention

The present invention relates to a display control apparatus and a display control method, and more particularly, to a display control apparatus and a display control method suitable for use in a video display apparatus that automatically performs image quality adjustment.

2. Description of the Related Art

Recently, image quality adjustment functions for higher image qualities, such as a noise reduction function, a gamma correction function, and a color tone correction function, have been mounted for many video display apparatuses such as TV receivers. In order to adjust individual parameters appropriately for these functions, a relatively sophisticated understanding of image characteristics is required. Therefore, it is common to preset, at shipping, some sets of parameters in accordance with the genre of video content or the like. The user can obtain videos with image qualities in accordance with purposes of watching, by a simple operation of selecting a set of preset parameters.

As one of such sets of parameters, there is a dynamic mode. In the dynamic mode, each parameter is adaptively varied in response to the characteristics of a video being displayed. As one example, when a video has high brightness over the entire screen, it is conceivable to set parameters so as to reduce the brightness and decrease the gamma correction value. Alternatively, when a video is dark with low brightness over the entire screen, it is conceivable to set parameters so as to increase the gamma correction value and enhance the contrast, and further to increase the color saturation. Adaptively carrying out such parameter control depending on video display allows the user to watch even videos which vary significantly in brightness or color shade temporally, always at easily viewable image quality.

Recent TV receivers primarily include models including an external input terminal for inputting moving image data or still image data. Some of such models allow a video of moving image data or still image data output from an external device connected to the external input terminal and a television broadcast video image to be displayed simultaneously. For example, video images composed of moving image data or still image data supplied from the external input terminal are arranged and synthesized at predetermined positions with respect to a television broadcast video image and displayed on a single screen.

Further, mounting an application that carries out editing of video and images in the TV receiver has also been proposed. In this case, moving image or still image data output from an external device and supplied via the external input terminal is supplied to the editing application and displayed. Using the user interface of the editing application, a user can perform such editing operations as image quality adjustment and the like on the video images displayed by the editing application. Results of the editing operations are continuously reflected in the display of images provided by the editing application.

In Japanese Patent Laid-Open No. 09-139865, a technique is described in which, for an image signal in which a plurality of video images are synthesized, the gamma correction value is selected so as to be synchronized with the display intervals of each of the video images based on range information for each video image displayed on the screen. According to Japanese Patent Laid-Open No. 09-139865, proper gamma correction can be carried out for each of the video images displayed on the screen.

Now, consider a case of using the dynamic mode and the editing application described above in combination. For example, the editing application displays on the screen a video image of the results of carrying out image quality adjustment on moving image data or still image data. The user can carry out further image quality adjustment on such moving image data or still image data with the editing application while looking at this display.

However, there is a problem in that, if the dynamic mode is selected as an image quality adjustment function of the TV receiver, image quality adjustment by the dynamic mode will be further carried out on the display of the results of image quality adjustment by the image editing application. As a result, there is a risk that the display will be one that does not properly reflect the intentions of the user as expressed in the image quality adjustment by the image editing application.

For example, for moving image data or still image data, there are cases in which data showing image sensing conditions at time of image sensing is added to such moving image data and still image data. Based on this image sensing condition data, the user can then carry out image quality adjustment that takes into account the environment at the time of image sensing using the image editing application. However, it is not always the case that image quality adjustment by the dynamic mode reflects the environment at the time of image sensing, and there is a risk that the intentions of the person doing the image sensing at the time of image sensing may not be properly reflected.

In addition, with the method of Japanese Patent Laid-Open No. 09-139865, because it attempts to perform correction of each range of each of the video images displayed in the screen, for example, it is possible to control matters so that image quality adjustment is not performed only on the range of a video image displayed by an image editing application for which image quality adjustment is unnecessary. However, in this case, it is necessary to enable/disable the image quality adjustment function for each pixel, which complicates circuit configuration.

SUMMARY OF THE INVENTION

The present invention has been made in consideration of the above situation, and provides, using a simple configuration, a display control apparatus and a display control method capable of providing image editing that a user intends in a display control apparatus having an image quality adjustment capability.

According to the present invention, provided is a display control apparatus comprising: a first image data input unit to which first image data is input; a second image data input unit to which second image data is input; a user operation reception unit that receives a user operation; an image quality correction unit that performs image quality correction processing of input first image data in response to the user operation received by the user operation reception unit, and generates and outputs image data for display of the first image data or of corrected first image data; an image quality adjustment unit that performs image quality adjustment processing of the image data output from the image quality correction unit and the second image data using preset parameters; and a control unit that controls the image quality adjustment unit to disable the image quality adjustment processing with the image quality correction unit in on state and enable the image quality adjustment processing with the image quality correction unit in an off state.

According to the present invention, also provided is a display control apparatus comprising: a first image data input unit to which first image data is input; a second image data input unit to which second image data is input; a user operation reception unit that receives a user operation; an image quality correction unit that performs image quality correction processing of input first image data in response to the user operation received by the user operation reception unit, and generates and outputs image data for display of the first image data or of corrected first image data; an image quality adjustment unit that performs image quality adjustment processing of the image data output from the image quality correction unit and the second image data using preset parameters; and a control unit that controls the image quality adjustment unit to disable the image quality adjustment processing in a case in which the image quality correction unit is in on state and the first image data satisfies a predetermined condition, and to enable the image quality adjustment processing in all other cases.

According to the present invention, further provided is a display control method comprising: an input step of inputting first image data and second image data; a user operation reception step of receiving a user operation; an image quality correction step of performing image quality correction processing of input first image data in response to the user operation and generating image data for display of the first image data or of corrected first image data; and an image quality adjustment step of performing image quality adjustment processing of the image data generated in the image quality correction step and the second image data using preset parameters, wherein the image quality adjustment processing is disabled with the image quality correction processing being executed in the image quality correction step and the image quality adjustment processing is enabled with the image quality correction not being executed.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

Figure 1:
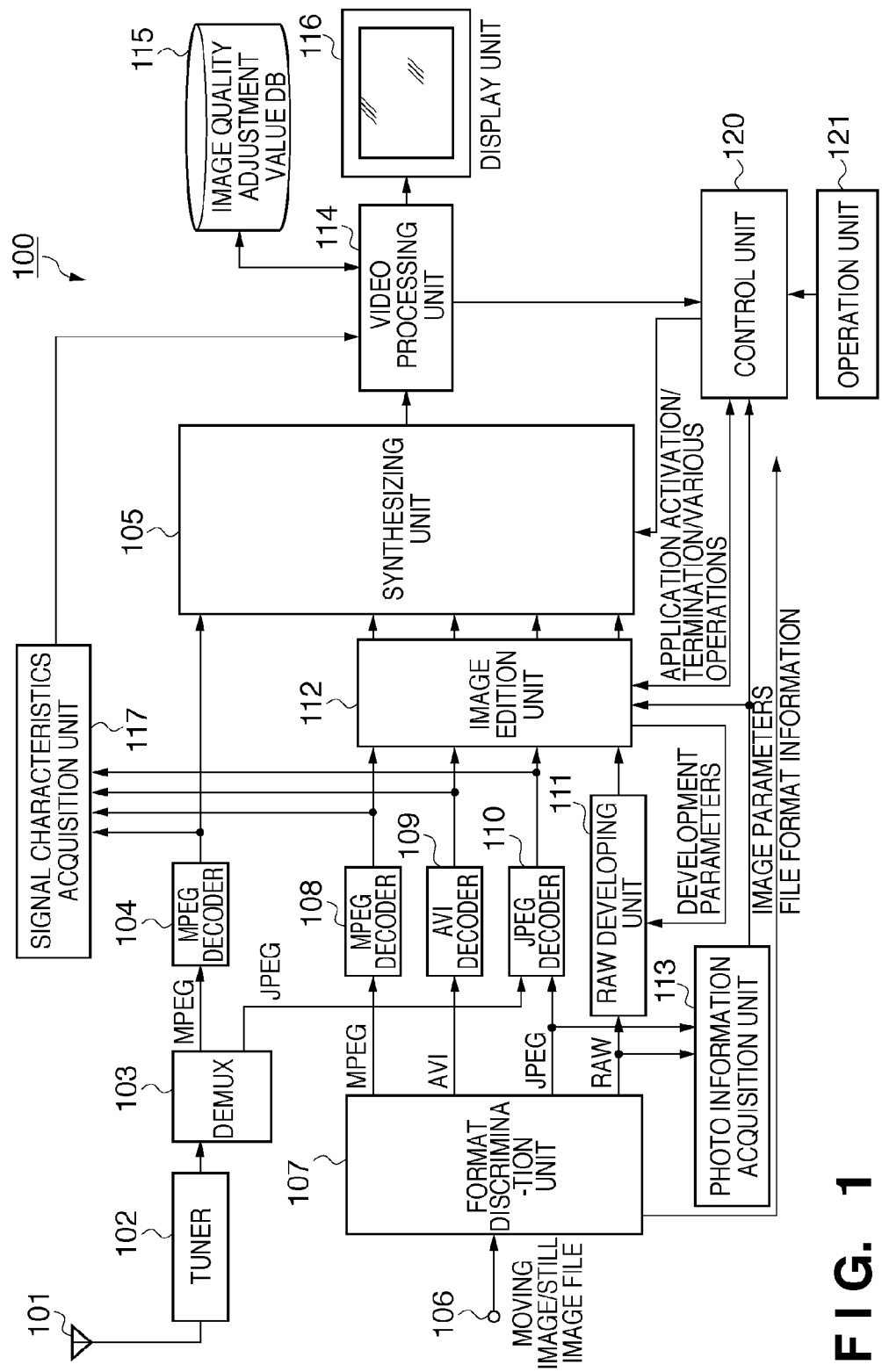
FIG. 1 is a block diagram illustrating an example of a configuration of a video display apparatus to which an embodiment of the present invention is applicable.

FIG. 1 shows an example of the configuration of a video display apparatus 100 to which an embodiment of the present invention is applicable. In the example of FIG. 1, the video display apparatus 100 is a TV receiver in which video received by an antenna 101 via TV broadcasting is displayed on the display unit 116. This video display apparatus 100 has an editing function that receives, as files, moving image or still image data generated in an external device, and edits the data. The video display apparatus 100 can synthesize an editing screen provided by the editing function and a video image provided by TV broadcasting into a single screen for display.

It is to be noted that, hereinafter, unless otherwise noted, moving image data or still image data is referred to as image data, whereas a moving image or still image file for storing moving image data or still image data is referred to as an image file.

A control unit 120 is composed of, for example, a CPU, a RAM, a ROM, etc., and controls the entire video display apparatus 100 with the use of a RAM as a working memory in accordance with a program stored in the ROM in advance. An operation unit 121 is provided with multiple manipulators for accepting user's operations, and outputs a control signal depending on the received operation. The control signal is supplied to the control unit 120. The control unit 120 transmits commands or the like to each unit of the video display apparatus 100, depending on the control signal, and controls the video display apparatus 100 so as to operate in response to the user's operation.

While the foregoing example has been described in terms of the video display apparatus 100 being provided directly with the manipulators of the operation unit 121, the configuration is not limited to this example. For example, the operation unit 121 may be composed of, for example, a remote control commander for modulating a control signal in response to an operation of an manipulator into an infrared signal and transmitting the infrared signal, and a receiving unit for receiving and demodulating the infrared signal.

For example, radio waves via ground-wave digital broadcasting are received by the antenna 101, converted into RF signals, and supplied to a tuner unit 102. The tuner unit 102 selects and demodulates signals in a specific frequency band from the RF signals supplied from the antenna 101, for example, in response to a user's operation to the operation unit 121, and restores MPEG2-TS. The restored MPEG2-TS, from which required packets are taken by a demultiplexer 103, is made into an elementary stream for MPEG2, which is supplied to a MPEG decoder 104.

Furthermore, in the demultiplexer 103, signals via data broadcasting, which are included in the received signals, are extracted and decoded. When still image data compressed and coded in JPEG format (hereinafter, JPEG data) is included in the decoded data, the data is supplied to a JPEG decoder 110.

The MPEG decoder 104 decodes the elementary stream for MPEG2, which has been supplied from the demultiplexer 103, and outputs moving image data and sound data. The moving image data is supplied to a synthesizing unit 105, and also supplied to a signal characteristics acquisition unit 117. It is to be noted that the sound data is not particularly related to the present invention, and thus the illustration or description of the sound data will be omitted.

On the other hand, the image data generated as a file in the external device is input to an external connection terminal 106, and supplied to a format discrimination unit 107. As the external device, for example, digital still cameras and digital video cameras are conceivable. Common personal computers can also be used as the external device. In these cases, the external connection terminal 106 corresponds to a predetermined interface such as a USB or an IEEE 1394. Alternatively, a removable nonvolatile memory such as a flash memory can be used. In this case, the external connection terminal 106 is composed of a connector corresponding to the memory and a driving circuit therefor.

The format discrimination unit 107 identifies the format of the file supplied from the external connection terminal 106. The format can be identified, for example, based on the extension contained in the file name of the file. It is also possible to identify the format by analyzing the file header section. In the example of FIG. 1, the format discrimination unit 107 identifies which format the file has, from among a MPEG2 format, an AVI format, a JPEG format and a RAW format. The result of this format identification is supplied to the control unit 120 as file format information.

The file which has been determined to be a file in the MPEG2 format by the format discrimination unit 107 is supplied to a MPEG decoder 108. The file which has been determined to be a file in the AVI format is supplied to an AVI decoder 109. The file which has been determined to be in the JPEG format is supplied to a JPEG decoder 110. The file which has been determined to be in the RAW format is supplied to a RAW developing unit 111.

The MPEG decoder 108 decodes the MPEG2 data stored in the supplied file, and outputs the decoded MPEG2 data as moving image data. The moving image data output from the MPEG decoder is supplied to an image edition unit 112 and is also supplied to the signal characteristics acquisition unit 117.

The AVI decoder 109 analyzes the supplied file, and determines whether or not the data stored in that file can be decoded. If it is determined that the data can be decoded, the AVI decoder 109 decodes the data stored in the file and outputs the decoded data as moving image data. The moving image data output from the AVI decoder 109 is supplied to the image edition unit 112 and is also supplied to the signal characteristics acquisition unit 117.

The JPEG decoder 110 decodes the data stored in the supplied file, and outputs the decoded data as bitmap still image data. The still image data output from the JPEG decoder 110 is supplied to the image edition unit 112 and is also supplied to the signal characteristics acquisition unit 117.

The RAW developing unit 111 develops the data stored in the supplied file, and outputs the developed RAW data as bitmap still image data. The still image data output from the RAW developing unit 111 is supplied to the image edition unit 112.

The signal characteristics acquisition unit 117 acquires the signal characteristics of the image data supplied from the MPEG decoder 104, the MPEG decoder 108, the AVI decoder 109, and the JPEG decoder 110. The operation of acquiring signal characteristics with the signal characteristics acquisition unit 117 is carried out at a predetermined interval, such as for each frame, for several frames, or for several tens of frames, for example, based on the frame timing of the image data supplied from the MPEG decoder 104.

For example, the signal characteristics acquisition unit 117 extracts and analyzes a luminance component and a color component from the supplied image data to acquire the luminance characteristics and color characteristics of the image data. Or, for example, the signal characteristics acquisition unit 117 carries out edge detection for the supplied image data to acquire edge information. It is to be noted that these luminance characteristics, color characteristics, and edge information are only examples of the signal characteristics of the images, and the signal characteristics of the images are not limited to the examples.

The signal characteristics acquisition unit 117 obtains signal characteristics that synthesize the acquired signal characteristics of the image data from the MPEG decoder 104 and the signal characteristics of the image data from the MPEG decoder 108, the AVI decoder 109, or the JPEG decoder 110. Information indicating these synthesized signal characteristics is supplied to a video processing unit 114.

Files determined to be in the JPEG format or the RAW format by the format discrimination unit 107 are also supplied to a photo information acquisition unit 113. The photo information acquisition unit 113 determines whether or not photo information is contained in the supplied file, and if it is determined that photo information is contained in the supplied file, the photo information acquisition unit 113 extracts the photo information from the file and supplies the extracted photo information to the image edition unit 112 and to the control unit 120. If it is determined that photo information is not contained in the supplied file, the photo information acquisition unit 113 notifies the control unit 120 of that determination.

For example, the photo information acquisition unit 113 checks whether or not the supplied file has Exif (Exchangeable Image File Format) data. If the file has Exif data, the photo information acquisition unit 113 extracts from the file various pieces of information at the time of photographing, such as the date of photographing, shutter speed, aperture value, and the like. This extracted photo information is supplied as image parameters to the image edition unit 112 and the control unit 120.

In response to control by the control unit 120, the image edition unit 112 performs editing on the moving image data and the still image data supplied from the MPEG decoder 108, the AVI decoder 109, the JPEG decoder 110, and the RAW developing unit 111. In addition, activation and stoppage of the image editing function by the image edition unit 112 is controlled by the control unit 120 in response to operation of the operation unit 121.

It is to be noted that the editing process performed by the image edition unit 112 is, for example, an image quality correction process, in which the image edition unit 112 corrects the contrast, sharpness, color, and the like of the video or the image. Also, the image edition unit 112 generates an image editing screen that is a processing screen for carrying out image quality correction, and in predetermined areas of the image editing screen displays the moving image data and still image data to be edited. Moreover, manipulators for changing values based on image parameters supplied from the photo information acquisition unit 113 as well as the parameters for carrying out correction are displayed in the image editing screen. A specific example of the image editing screen will be described later. Image data for displaying the image editing screen is supplied to the synthesizing unit 105.

It is to be noted that the image edition unit 112, in actuality, is for example implemented by a program running on the CPU that the control unit 120 has. The image edition unit 112 is not limited thereto, however, and can also be configured as dedicated hardware controlled by the control unit 120.

In addition, the image data that is edited by the image edition unit 112 may be used only for display on the image editing screen, or, although not shown, may be supplied to the external device via the external connection terminal 106. It is also contemplated that a hard disk or other recording medium may be provided to the video display apparatus 100, and edited image data saved.

The synthesizing unit 105, on the basis of control exercised by the control unit 120, arranges images provided by moving image data supplied from the MPEG decoder 104 and image editing screen images supplied from the image edition unit 112 on a single screen and synthesizes the image data into a single image that it then outputs. In a case in which image data is supplied from only one of the MPEG decoder 104 and the image edition unit 112, the synthesizing unit 105 outputs that image data. As for the method used for the image synthesis, a variety of methods are conceivable. For example, a method can be used in which timing is controlled in units of pixels and the data rearranged, or a method in which multiple plane memories are used. In addition, when synthesizing, alpha blending using opacity degree α and the complement of opacity degree α can be carried out. The image data output from the synthesizing unit 105 is supplied to the video processing unit 114.

Connected to the video processing unit 114 is an image quality adjustment value database 115 in which signal characteristics information, on the one hand, and image quality adjustment values as parameters for image quality adjustment, on the other, are associated with each other and stored in advance. In accordance with control exerted by the control unit 120, the video processing unit 114 refers to the image quality adjustment value database 115 and selects the image quality adjustment value on the basis of the signal characteristics information supplied from the signal characteristics acquisition unit 117. Then, with the selected image quality adjustment value as a parameter, the video processing unit 114 performs image quality adjustment on the image data supplied from the synthesizing unit 105. By carrying out image quality adjustment continually in response to the signal characteristics information supplied at predetermined intervals from the signal characteristics acquisition unit 117, a dynamic mode that carries out image quality adjustment adaptively on the video in the direction of time is achieved.

It is to be noted that the image quality adjustment carried out by the video processing unit 114 may be carried out in various ways. For example, processing of image data may include noise reduction processing, gamma correction processing, sharpness (edge enhancement) processing, and color (color tone) correction processing. Furthermore, when the display device of the display unit 116 is a device which requires a backlight, such as an LCD, the video processing unit 114 can carry out adjustment of the brightness of the backlight for the LCD, as image quality adjustment. In the dynamic mode, the processing described above is carried out in a dynamic manner, on the basis of the signal characteristics information supplied from the signal characteristics acquisition unit 117.

Whether the dynamic mode by the video processing unit 114 is to be enabled or disabled is determined by the control unit 120. That is, the control unit 120, in response to operation of the operation unit 121, controls enabling and disabling of the dynamic mode by the video processing unit 114. Although a detailed description is given later, the control unit 120 can also determine whether to enable or to disable the dynamic mode depending on results of the identification performed by the format discrimination unit 107.

The image data output from the video processing unit 114 is supplied to the display unit 116. The display unit 116 is composed of, for example, a display device such as an LCD (Liquid Crystal Display) and a driving circuit for driving the display device.

Figure 2:
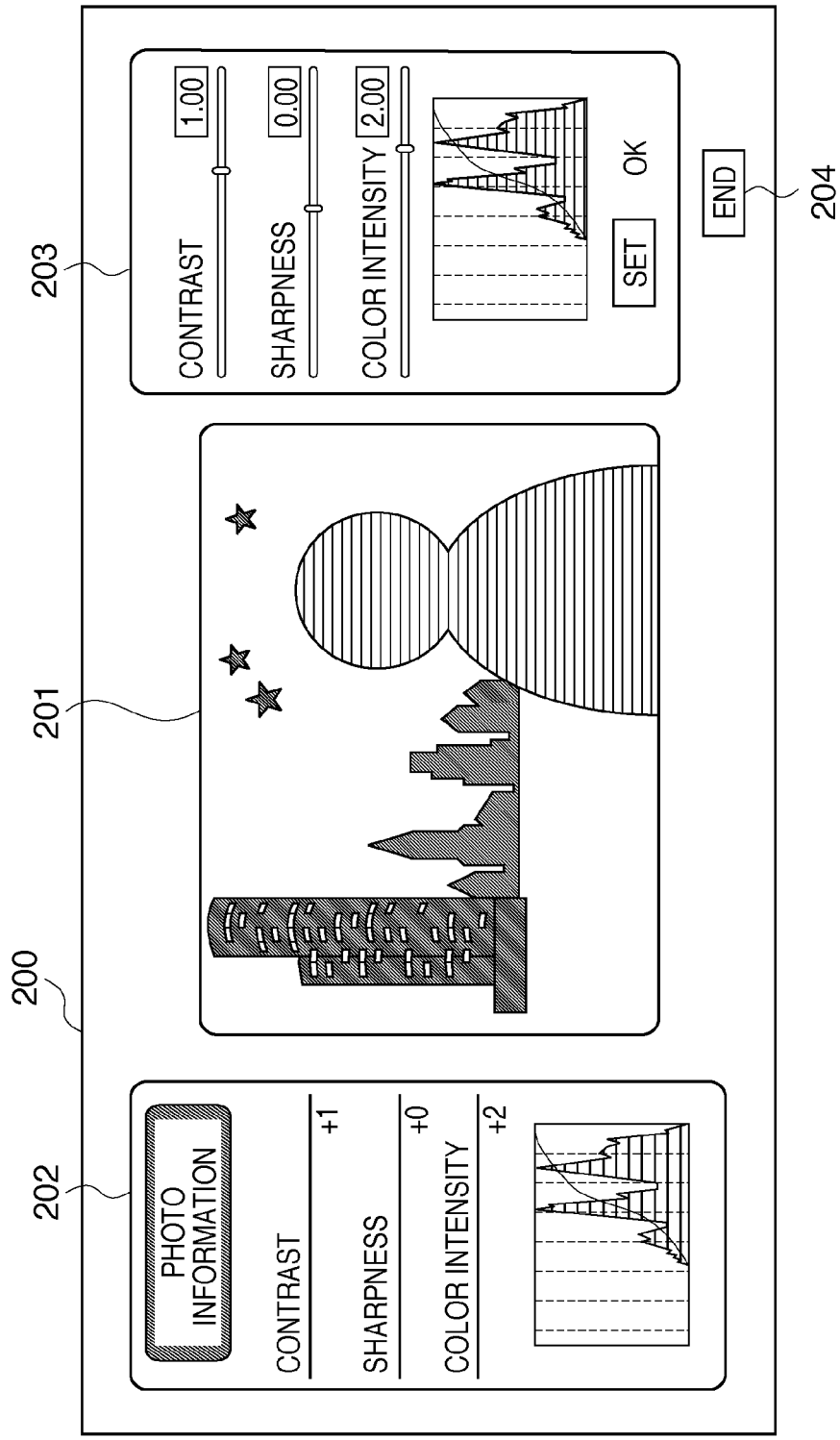
FIG. 2 is a diagram illustrating an example of a configuration of an image editing screen.

FIG. 2 is a diagram illustrating an example of a configuration of an image editing screen 200 generated by the image edition unit 112. Image data supplied from the MPEG decoder 108, the AVI decoder 109, the JPEG decoder 110, or the RAW developing unit 111 is displayed in area 201. A display based on image parameters acquired by the photo information acquisition unit 113 is carried out in area 202. In the example shown in FIG. 2, values respectively indicating contrast, sharpness, and color density are displayed in area 202, as is a histogram of the luminance component. Parameters that the user can adjust by operating the operation unit 121 and manipulators for carrying out such operation (slidebar displays in the example shown in FIG. 2) are displayed in area 203.

When the manipulators provided in area 203 are operated using the operation unit 121, the corresponding parameters change in response, and the results are reflected in the image that is displayed in area 201.

In addition, in a case in which an image produced by image data from the RAW developing unit 111 is displayed in area 201, the image parameters changed in response to operation are supplied to the RAW developing unit 111, and the RAW developing unit 111 is then instructed to redevelop using those image parameters. In accordance with that instruction, the RAW developing unit 111 again develops the RAW data based on the supplied image parameters. By so doing, an image after redevelopment of the RAW data is displayed in area 201 of the image editing screen 200.

The manipulator 204 (a button in the example shown in FIG. 2) is for directing that the image editing function carried out by the image edition unit 112 be terminated. When the manipulators 204 is operated by the operation unit 121, the control unit 120 stops the image editing function and erases the image editing screen 200 from the screen. It is to be noted that activation of the image editing function by the image edition unit 112 is carried out by operating, using the operation unit 121, a manipulator indicating the relevant function that is displayed, for example, in a system menu that is displayed by the control unit 120.

Next, a description is given of dynamic mode control by the embodiment of the present invention. In the embodiment of the present invention, the dynamic mode is switched between enabled and disabled in response to activation and stoppage of the image editing function by the image edition unit 112. In addition, for files of a certain specific format supplied to the image edition unit 112, the dynamic mode is switched between enabled and disabled depending on whether or not they hold photo information. More specifically, the dynamic mode is controlled so as to be enabled and disabled in accordance with the following conditions.

First, there are the following two conditions, (1) and (2), under which the dynamic mode is enabled:
(1) the image editing function is turned off
(2) the image editing function is in an activated state and a JPEG file that does not have photo information is input to the external connection terminal 106.

By contrast, there are the following three conditions, (3), (4), and (5), under which the dynamic mode is disabled:
(3) the image editing function is in the activated state and a RAW file or a moving image file (MPEG file, AVI file) is input to the external connection terminal 106
(4) the image editing function is in the activated state and a JPEG file that has photo information is input to the external connection terminal 106
(5) the image editing function is in the activated state and there is no file input to the external connection terminal 106.

In the embodiment of the present invention, the dynamic mode is enabled and disabled based on the above-described conditions (1) through (5). As a result, the effects of image quality control by the dynamic mode are not sustained when editing such as image quality correction or the like is carried out on images of image files input to the external connection terminal 106 in an effort to make the images high quality.

It is to be noted that JPEG files that do not have photo information are likely to be ones for which no particularly high quality is sought in image quality correction, and the dynamic mode is enabled. Of course, the dynamic mode can also be disabled when image editing JPEG files that do not have photo information.

Figure 3:
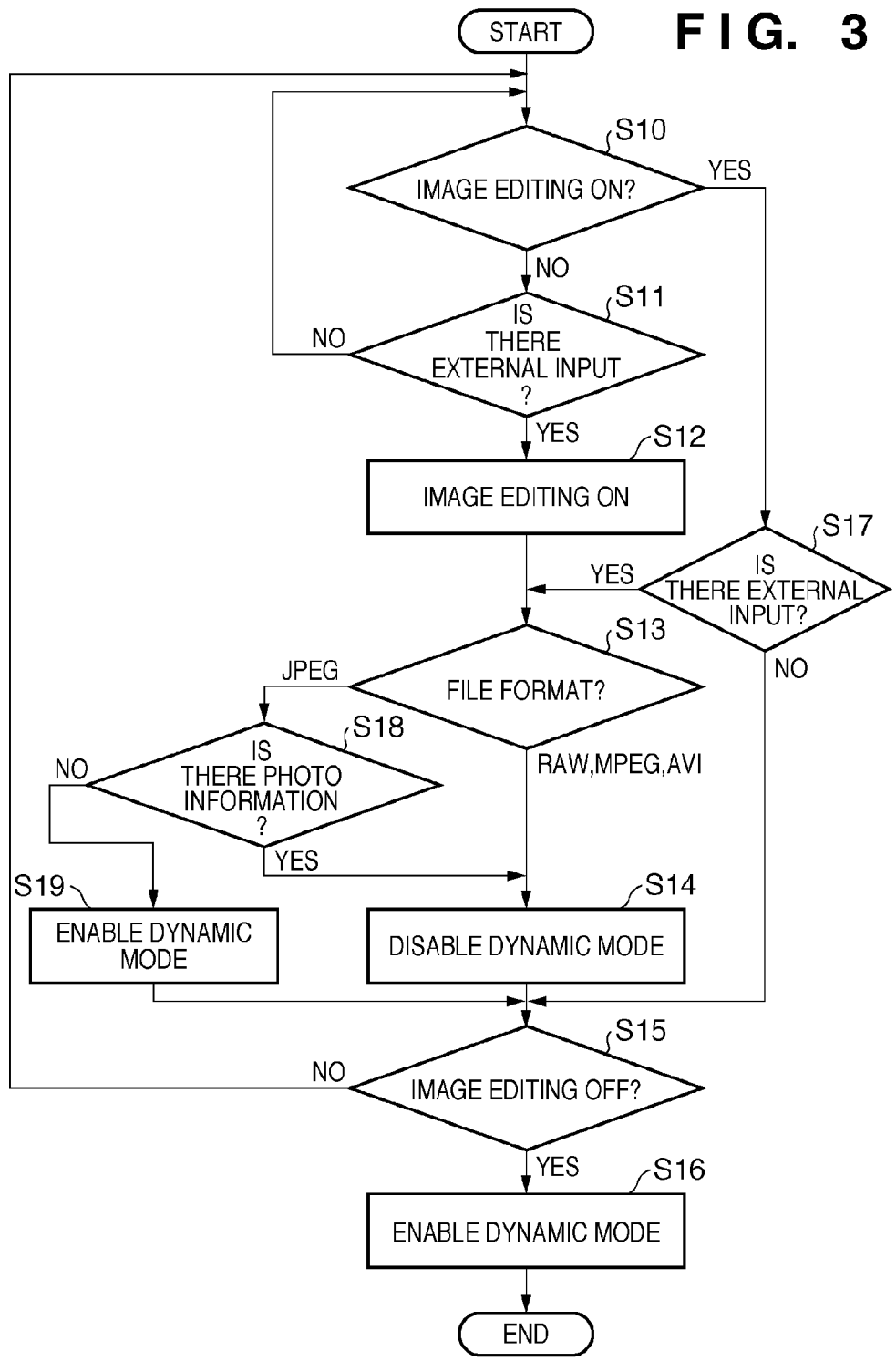
FIG. 3 is a flowchart illustrating an example of processing performed by an embodiment of the present invention.

FIG. 3 is a flowchart illustrating an example of processing performed by the embodiment of the present invention, for the purpose of determining the above-described conditions (1) through (5) and enabling and disabling the dynamic mode.

It is to be noted that the steps shown in the flowchart in FIG. 3 are executed by the control unit 120 in accordance with a program. In addition, the control unit 120, in accordance with information (flags) indicating dynamic mode enable and disable, enables and disables the dynamic mode in the video processing unit 114. Moreover, prior to execution of the processing shown in the flowchart shown in FIG. 3, the dynamic mode is enabled in the video processing unit 114.

In step S10, the control unit 120 determines whether or not the image editing function by the image edition unit 112 is activated. If it is determined that the image editing function is not activated, processing proceeds to step S11 and it is determined whether or not there is file input to the external connection terminal 106. If it is determined that there is no file input, processing returns to step S10.

In step S11, if it is determined that there is file input to the external connection terminal 106, processing proceeds to step S12 and the image editing function by the image edition unit 112 is activated. Then, in a subsequent step S13, the file format of the file that is input to the external connection terminal 106 is identified by the format discrimination unit 107, and processing is bifurcated based on the results of that identification.

If in step S13 it is determined by the format discrimination unit 107 that the file input to the external connection terminal 106 is a RAW file or a moving image file (MPEG file, AVI file), processing proceeds to step S14.

On the other hand, if in step S13 it is determined that the file that is input to the external connection terminal 106 is a JPEG file, then processing proceeds to step S18. In step S18, the control unit 120 determines whether or not that JPEG file has photo information (in this case, Exif information) based on the output of the photo information acquisition unit 113. If the control unit 120 determines that that JPEG file does have photo information, processing proceeds to step S14.

In addition, if in step S10 described above it is determined that the image editing function is activated, processing proceeds to step S17 and it is determined whether or not there is file input to the external connection terminal 106. If it is determined that there is file input, then processing proceeds to step S13. This determination can be made, for example, by the control unit 120 querying the format discrimination unit 107 as to whether or not there is file input to the external connection terminal 106. By contrast, if it is determined that there is no file input, processing proceeds to step S14.

In step S14, the flag that controls the dynamic mode enable and disable (hereinafter "dynamic mode control flag") is set to a value that indicates disable. Then, the control unit 120, in response to the value of the dynamic mode control flag, if it determines that the current dynamic mode is in the enable state, controls the video processing unit 114 and shifts the dynamic mode to the disable state. If the current dynamic mode is in the disable state, the control unit 120 does not do anything to the video processing unit 114. Once the process of step S14 is finished, processing proceeds to step S15.

On the other hand, if in step S18 it is determined that the JPEG file does not have photo information, processing proceeds to step S19. In step S19, the dynamic mode control flag is set to a value that indicates enable. Then, processing proceeds to step S15.

In step S15, it is determined whether or not the image editing function by the image edition unit 112 has been stopped. If it is determined that the image editing function has not been stopped, that is, if it is determined that the image editing function has been activated, processing returns to step S10. On the other hand, if it is determined that the image editing function has been stopped, processing proceeds to step S16 and the dynamic mode control flag is set to a value that indicates enable.

In addition, according to another embodiment of the present invention, regardless of the type of file that is input to the external connection terminal 106, the control unit 120 may control the video processing unit 114 so as to disable image quality adjustment processing when the image edition unit 112 is in the activated state, and enable image quality adjustment processing when the image edition unit 112 is turned off.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-152256, filed Jun. 10, 2008, which is hereby incorporated by reference herein in its entirety.

What is claimed is:

1. A display control apparatus comprising:
   a first image data input unit configured to receive first image data from a television broadcast;
   a second image data input unit to which second image data is input from an external apparatus;
   a synthesizing unit configured to generate and output image data of one frame by synthesizing the first image data and the second image data; and
   an image processing unit having an image editing function, capable of being set to on or off, to edit the second image data in response to a user instruction in a case where it is instructed to edit the second image data by a user before the second image data is input to the synthesizing unit in a case where the image editing function is set to on;
   an image quality adjustment unit configured to, when a dynamic mode is enabled, perform image quality adjustment processing on the image data output from the synthesizing unit for automatically adjusting the image quality of the output image data in accordance with characteristics of the output image data if any of predetermined conditions is satisfied, and not to perform the image quality adjustment processing if none of the predetermined conditions is satisfied,
   wherein the predetermined conditions include a condition that the image editing function of the image processing unit is set to off, and the dynamic mode is disabled upon editing the second image data by the image processing unit if the dynamic mode is in an enabled state.

2. The display control apparatus according to claim 1, further comprising a signal characteristics acquisition unit that acquires signal characteristics of the input first image data and the second image data,
   wherein the image quality adjustment unit sets parameters for the image quality adjustment processing based on the signal characteristics acquired by the signal characteristics acquisition unit.

3. The display control apparatus according to claim 2, wherein the parameters include at least one of the parameters for brightness, gamma correction, sharpness, color tone correction, and noise reduction.

4. The display control apparatus according to claim 1, further comprising a discrimination unit that identifies a format of the input second image data,
   wherein the predetermined conditions further include a condition that the second image data does not have photo information that is data representing image sensing conditions at a time of sensing an image.

5. The display control apparatus according to claim 1, wherein the predetermined conditions further include a condition that the user instruction to the second image data is not input from a user and a condition that a RAW file or a moving image file is not input to the second image input unit.

6. The display control apparatus according to claim 1, wherein the predetermined conditions further include a condition that the user instruction to the second image data is not input from a user and a condition that a JPEG file having image sensing information is not input to the second image input unit.

7. The display control apparatus according to claim 1, wherein the edition to the second image data includes image quality correction including contrast correction, sharpness correction, and color correction.

8. The display control apparatus according to claim 1, wherein the predetermined conditions include a condition in that an image having no photo information is input to the second image data input unit as the second image data.

9. The display control apparatus according to claim 1 further comprising a determination unit configured to determine whether the image editing function is set to on or off,
wherein in a case where the determination unit determines that the image editing function is set to off when the dynamic mode is disabled, the dynamic mode is enabled.

10. The display control apparatus according to claim 1, wherein the dynamic mode is a mode to adaptively vary each parameter used for adjusting the image quality of the output image data in accordance with the characteristics of the output image data.

11. A display control method comprising:
inputting first image data from a television broadcast if it is received by a first image data input unit to a display control apparatus;
inputting second image data if it is input from an external apparatus by a second image data input unit to the display control apparatus;
editing the second image data in response to a user instruction in a case where it is instructed to edit the second image data by a user;
generating and outputting image data of one frame by synthesizing the first image data and the second image data in a case where both the first image data and the second image data are input; and
performing, when a dynamic mode is enabled, image quality adjustment processing on the output image data for automatically adjusting the image quality of the output image data in accordance with characteristics of the output image data if any of predetermined conditions is satisfied, and not to perform the image quality adjustment processing if none of the predetermined conditions is satisfied,
wherein the edition to the second image data is performed in a case where an image editing function, capable of being set to on or off, is set to on, and the predetermined conditions include a condition that the image editing function is set to off, and the dynamic mode is disabled upon editing the second image data if the dynamic mode is in an enabled state.

12. The display control method according to claim 11, further comprising a signal characteristics acquisition step of acquiring signal characteristics of the input first image data and the second image data,
wherein parameters for the image quality adjustment processing are set in the image quality adjustment processing based on the signal characteristics acquired in the signal characteristics acquisition step.

13. The display control method according to claim 12, wherein the parameters include at least one of the parameters for brightness, gamma correction, sharpness, color tone correction, and noise reduction.

14. The display control method according to claim 11, further comprising a discrimination step of identifying a format of the input second image data,
wherein the predetermined conditions further include a condition that the second image data does not have photo information that is data representing image sensing conditions at a time of sensing an image.

15. The display control method according to claim 11, wherein the predetermined conditions further include a condition that the user instruction to the second image data is not input from a user and a condition that a RAW file or a moving image file is not input as the second image data.

16. The display control method according to claim 11, wherein the predetermined conditions further include a condition that the user instruction to the second image data is not input from a user and a condition that a JPEG file having image sensing information is not input as the second image data.

17. The display control method according to claim 11, wherein the edition to the second image data includes image quality correction including contrast correction, sharpness correction, and color correction.

18. The display control method according to claim 11, wherein the predetermined conditions include a condition in that an image having no photo information is input by the second image data input unit as the second image data.

19. The display control method according to claim 11 further comprising determining whether the image editing function is set to on or off,
wherein in a case where it is determined that the image editing function is set to off when the dynamic mode is disabled, the dynamic mode is enabled.

20. The display control method according to claim 11, wherein the dynamic mode is a mode to adaptively vary each parameter used for adjusting the image quality of the output image data in accordance with the characteristics of the output image data.

* * * * *